United States Patent [19]

Seiki et al.

[11] Patent Number: 5,403,503
[45] Date of Patent: Apr. 4, 1995

[54] REFRIGERATOR OIL COMPOSITION FOR HYDROGEN-CONTAINING HYDROFLUOROCARBON REFRIGERANT

[75] Inventors: Hiromichi Seiki; Masato Kaneko, both of Ichihara, Japan

[73] Assignee: Idemitsu Kosan Co., Ltd., Tokyo, Japan

[21] Appl. No.: 743,293

[22] PCT Filed: Nov. 13, 1990

[86] PCT No.: PCT/JP90/01469
§ 371 Date: Aug. 14, 1991
§ 102(e) Date: Aug. 14, 1991

[87] PCT Pub. No.: WO91/09096
PCT Pub. Date: Jun. 27, 1991

[30] Foreign Application Priority Data

Dec. 14, 1989 [JP] Japan ................... 1-322559
Mar. 31, 1990 [JP] Japan ................... 2-87014

[51] Int. Cl.$^6$ ............... C10M 169/04; C10M 107/34; C10M 137/04; C10M 129/76
[52] U.S. Cl. ................... 252/52 A; 252/565; 252/56 R; 252/68
[58] Field of Search ............ 252/68, 52 A, 56 S, 252/54, 56 R

[56] References Cited

U.S. PATENT DOCUMENTS

| | | | |
|---|---|---|---|
| 4,248,726 | 2/1981 | Uchinuma et al. | 252/68 |
| 4,454,052 | 6/1984 | Shoji et al. | 252/68 |
| 4,851,144 | 7/1989 | McGraw et al. | 252/52 A |
| 4,948,525 | 8/1990 | Sasaki et al. | 252/52 A |
| 4,959,169 | 9/1990 | McGraw et al. | 252/68 |
| 4,971,712 | 11/1990 | Gorski et al. | 252/52 A |
| 4,975,212 | 12/1990 | Thomas et al. | 252/54 |
| 5,008,028 | 4/1991 | Jolley et al. | 252/68 |
| 5,021,180 | 6/1991 | McGraw | 252/68 |
| 5,080,816 | 1/1992 | Sakamoto et al. | 252/52 A |
| 5,096,606 | 3/1992 | Magihana et al. | 252/68 |
| 5,185,092 | 2/1993 | Fukuda et al. | 252/565 |

FOREIGN PATENT DOCUMENTS 0377122 7/1990 European Pat. Off. .
0384724 8/1990 European Pat. Off. .
2216541 10/1989 United Kingdom .

*Primary Examiner*—Prince Willis, Jr.
*Assistant Examiner*—J. Silbermann
*Attorney, Agent, or Firm*—Antonelli, Terry, Stout & Kraus

[57] ABSTRACT

There is disclosed a refrigerator oil composition for hydrogen-containing hydrofluorocarbon (hydrogenated Flon compound) refrigerant which comprises a polyoxyalkylene glycol derivative and/or a specific polyester compound, which are/is compounded with (a) an aliphatic acid partially esterified with a polyhydric alcohol and (b) a phosphate compound and/or a phosphite compound. The refrigerator oil composition according to the present invention can be utilized as a refrigerator oil effective for improving wear resistance, especially that between aluminum material and steel material owing to the excellent miscibility with hydrogenated Flon refrigerant such as Flon 134a as well as prominent lubrication performance.

24 Claims, No Drawings

REFRIGERATOR OIL COMPOSITION FOR HYDROGEN-CONTAINING HYDROFLUOROCARBON REFRIGERANT

TECHNICAL FIELD

The present invention relates to a refrigerator oil composition for hydrogen-containing hydrofluorocarbon refrigerant. More particularly, it relates to a refrigerator oil composition which has favorable miscibility with a hydrogen-containing hydrofluorocarbon (hydrogenated fluoroalkane) (hereinafter referred to as "hydrogenated Flon compound") such as 1,1,1,2-tetrafluoroethane (hereinafter referred to as "Flon 134a") capable of being used as a replacement of a chlorofluorocarbon (Flon compound) such as dichlorodifluoromethane (hereinafter referred to as "Flon 12") as a refrigerant now causing a serious environmental pollution problem, and at the same time, which is excellent in lubrication performance as well as wear resistance.

BACKGROUND ART

Polyoxyalkylene glycol derivatives have recently been reported as being effective as a lubricating oil for a refrigerator employing a hydrogenated Flon refrigerant such as Flon 134a without a fear of causing environmental pollution problem by virtue of their high miscibility with the above-mentioned hydrogenated Flon refrigerant (Specification of U.S. Pat. No. 4,755,316).

Nevertheless, the polyoxyalkylene glycol derivatives are poor in wear resistance and increase the wear between aluminum material and steel material in a refrigerator in an atmosphere of aforementioned refrigerant, thus causing serious problem in practical application. The frictional surfaces between aluminum material and steel material include the contact surface of a piston and piston shoe for a reciprocating compressor, and that of a vane and housing for a rotary compressor. In either case, lubrication is important for the friction surfaces.

On the other hand, the conventional extreme pressure agents which have heretofore been used in refrigerator oil impaired the stability of the oil and suffered insufficient wear-resistance effect, making themselves impossible to endure practical application.

DISCLOSURE OF INVENTION

In order to develop a refrigerator oil (lubricating oil) which is excellent in lubrication performance as well as miscibility with hydrogenated Flon refrigerant such as Flon 134a, and at the same time, effective for improving wear resistance, especially the wear resistance between aluminum material and steel material, intensive research and investigation have been made by the present inventors. As a result, it has been found that the above-mentioned purpose can be attained by compounding (a) a polyhydric alcohol partially esterified with an aliphatic acid and (b) a phosphate compound and/or phosphite compound in a polyoxyalkylene glycol and/or a specific polyester compound. The present invention has been accomplished on the basis of such a finding.

That is, the present invention provides a refrigerator oil composition for hydrogen-containing hydrofluorocarbon refrigerant which comprises at least one compound selected from (A) a polyoxyalkylene glycol derivative, and (B) polyester compounds having a kinematic viscosity at 40° C. of 5 to 1000 cSt and at least two ester linkages which are compounded with (a) a polyhydric alcohol partially esterified with an aliphatic acid and (b) at least one compound selected from phosphate compounds and phosphite compounds.

Furthermore, the present invention provides a method for effecting lubrication in a compression-type refrigerator using a hydrofluorocarbon as a refrigerant characterized in that the lubrication is effected by the use of the above-mentioned refrigerator oil composition, and still furthermore, the present invention provides a compression-type refrigeration system which comprises compressor(s), the hydrogen-containing hydrofluorocarbon as a refrigerant and the above-mentioned refrigerator oil composition as a lubricating oil.

BEST MODE FOR CARRYING OUT THE INVENTION

The refrigerator oil composition according to the present invention comprises, as essential components, (A) a polyoxyalkylene glycol derivative, (B) a polyester compound having a kinematic viscosity at 40° C. of 5 to 1000 cSt and at least two ester linkages, or a mixture of the above (A) and (B).

The polyoxyalkylene glycol derivative as the component (A) includes a variety of compounds, which may be optionally selected according to the purpose of use. A suitable polyoxyalkylene glycol derivative is exemplified by a compound represented by the formula

and/or

wherein $R^1$, $R^3$, $R^5$, $R^7$ and $R^9$ are each a hydrogen atom, an alkyl group having 1 to 20 carbon atoms, an alkenyl group having 2 to 20 carbon atoms, an alkynyl group having 2 to 20 carbon atoms, an acyl group having 1 to 20 carbon atoms, an aryl group having 6 to 20 carbon atoms, an aralkyl group having 7 to 20 carbon atoms or a cycloalkyl group having 4 to 20 carbon atoms; $R^2$, $R^4$, $R^6$ and $R^8$ are each an alkylene group having 2 to 4 carbon atoms; m is an integer from 3 through 10; and n, p and r are each a positive integer simultaneously satisfying the relationship $3 \leq n+p+r \leq 100$.

The foregoing compound may be used alone or in combination with each other. As mentioned before, $R^1$, $R^3$, $R^5$, $R^7$ and $R^9$ are each, in addition to a hydrogen atom; an alkyl group having 1 to 20 carbon atoms such as methyl, ethyl, propyl, butyl; an alkenyl group having 2 to 20 carbon atoms such as vinyl, allyl, butenyl; an alkynyl group having 2 to 20 carbon atoms such as ethynyl, propynyl; an aryl group having 6 to 20 carbon atoms such as phenyl, tolyl, xylyl, nonylphenyl, dodecylphenyl; an aralkyl group having 7 to 20 carbon atoms such as benzyl, phenetyl; or a cycloalkyl group having 4 to 20 carbon atoms such as cyclohexyl, cycloheptyl, methylcyclohexyl, nonylcyclohexyl. Among them, a hydrogen atom and an alkyl group having 1 to 10 carbon atoms are preferable. In particular, a compound of the formula (I) wherein $R^1$ and $R^3$ are simultaneously methyl is most suitable.

As mentioned before, $R^2$, $R^4$, $R^6$ and $R^8$ are each an alkylene group having 2 to 4 carbon atoms such as a group of ethylene, propylene or butylene. In the formula (I), m is an integer from 3 through 100, preferably 6 through 60, and n, p and r in the formula (II) are each a positive integer simultaneously staisfying the relationship $3 \leq n+p+r \leq 100$, preferably $6 \leq n+p+r \leq 60$.

The compound represented by the general formula (I) or (II) has a kinematic viscosity at 100° C. of preferably 2 to 250 cSt. The compound represented by the general formula (I) has a kinematic viscosity at 100° C. of desirably 5 to 50 cSt, more desirably 6 (when m=12) to 50 cSt, still more desirably 7 (when m=14) to 50 cSt, most desirably 9 (when m=19) to 50 cSt.

In the formula (I) & (II), it is preferable that $R^2O$, $R^4O$, $R^6O$ and $R^8O$ are each a copolymer containing ethylene-oxide unit of 30% by weight or less, for example, a copolymer of ethylene oxide unit and propylene oxide unit.

The polyoxyalkylene glycol derivative to be used in the present invention may be exemplified, in addition to the above-mentioned compounds, by a compound having at least one constitutional unit represented by the general formula

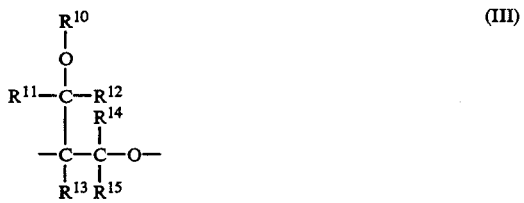

(III)

wherein $R^{10}$ indicates a monovalent hydrocarbon radical having 1 to 10 carbon atoms, and $R^{11}$ through $R^{15}$ stand for a hydrogen atom or a monovalent hydrocarbon radical having 1 to 10 carbon atoms.

In the refrigerator oil composition of the present invention, there may be used, as an essential component, a polyester compound having a kinematic viscosity at 40° C. of 5 to 1000 cSt, preferably 10 to 500 cSt and at least two ester linkages in place of (A) a polyoxyalkylene glycol derivative. A variety of compounds are available as the aforementioned polyester compound and may be optionally selected according to the purpose of use. Among them, a suitable compound is exemplified by reaction products represented by the following (IV) to (VIII).

(IV) a reaction product of (1) a polybasic carboxylic acid or derivative thereof, (2) a polyhydric alcohol or derivative thereof and (3) a monobasic aliphatic acid or derivative thereof.

(V) a reaction product of (1) a polybasic carboxylic acid or derivative thereof, (2) a polyhydric alcohol or derivative thereof and (4) a monohydric aliphatic alcohol or derivative thereof.

(VI) a reaction product of (2) a polyhydric alcohol or derivative thereof and (3) a monobasic aliphatic acid or derivative thereof, preferably a equivalent reaction product.

(VII) a reaction product of (4) a monohydric aliphatic alcohol or derivative thereof and (1) a polybasic carboxylic acid or derivative thereof.

(VIII) a reaction product of (1) a polybasic carboxylic acid or derivative thereof and (2) a polyhydric alcohol or derivative thereof.

Among a variety of (1) polybasic carboxylic acids, preferable ones include an aliphatic saturated dicarboxylic acid having 2 to 12 carbon atoms such as oxalic acid, malonic acid, succinic acid, glutaric acid, adipic acid, pimelic acid, suberic acid, azelaic acid, sebacic acid, dodecanedioic acid; an aliphatic unsaturated dicarboxylic acid having 4 to 14 carbon atoms such as maleic acid, fumaric acid, alkenyl succinic acid; an aromatic dicarboxylic acid having 8 carbon atoms such as phthalic acid, isophthalic acid, terephthalic acid; a dicarboxylic acid such as epoxide including epoxyhexahydrophthalic acid, etc.; and polybasic (tribasic or more) such as citric acid, trimellitic acid, pyromellitic acid.

Derivatives of polybasic carboxylic acid are exemplified by monoester, diester, metal salt, anhydride, acid chloride and the like each of polybasic carboxylic acid.

Examples of (2) polyhydric alcohol include glycols such as ethylene glycol, diethylene glycol, triethylene glycol, tetraethylene glycol, polyethylene glycol, propylene glycol, dipropylene glycol, polypropylene glycol, 1,2-butylene glycol, 1,3-butylene glycol, 1,4-butylene glycol, 2,3-butylene glycol, polybutylene glycol, 2-methyl-2,4-pentanediol, 2-ethyl-1,3-hexanediol; glycerol; hindered alcohol such as neopentyl glycol, trimethylol propane, pentaerythritol, dipentaerythritol; sorbitol; sorbitan and the like. Derivatives of polyhydric alcohol are exemplified by chloride, metal salt thereof.

Among a variety of (3) monobasic aliphatic acids (primary, secondary, and tertial), those having an alkyl group having 1 to 20 carbon atoms, particularly branched-chain alkyl group having 3 to 18 carbon atoms, more particularly 4 to 12 carbon atoms are preferable because of their favorable miscibility with Flon as a refrigerant, that is, the higher miscibility temperature at elevated temperatures. Specific examples of such monobasic aliphatic acids include acetic acid, propionic acid, butyric acid, isobutyric acid, pivalic acid, n-valeric acid, isovaleric acid, caproic acid, 2-ethylbutyric acid, n-caproic acid, 2-methylcaproic acid, n-heptylic acid, n-octanoic acid, 2-ethylhexanoic acid, 3,5,5-trimethylhexanoic acid, nonanoic acid, tert-nonanoic acid, dodecanoic acid, tert-dodecanoic acid, lauric acid and the like. Derivatives of such monobasic aliphatic acids are exemplified by ester, metal salt, acid chloride, anhydride thereof and the like.

Among a variety of (4) monohydric aliphatic alcohols or derivatives thereof, those having an alkyl group having 1 to 20 carbon atoms, particularly branched-chain alkyl group having 3 to 18 carbon atoms, more particularly 4 to 12 carbon atoms are preferable because of their favorable miscibility with Flon as a refrigerant, that is, the higher miscibility temperature at elevated temperatures. Specific examples of such monohydric aliphatic alcohols include methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, tert-amyl alcohol, diethyl carbinol, n-hexyl alcohol, methylamyl alcohol, ethylbutyl alcohol, heptyl alcohol, methylamyl carbinol, dimethylpentyl alcohol, n-octyl alcohol, sec-octyl alcohol, 2-ethylhexyl alcohol, isooctyl alcohol, n-nonyl alcohol, diisobutyl carbinol, n-decyl alcohol, isodecyl alcohol and the like. Derivatives of such monohydric aliphatic alcohols are exemplified by chloride, methal salt thereof and the like.

It is desirable that a polyester compound to be used in the present invention has a specific range of kinematic viscosity and at the same time, is composed of at least one of the reaction products as defied by the above-described (IV) to (VIII). A reaction product (IV) is obtained by reacting the above compounds (1), (2) and (3) with each other. Though the chemical structures of the reaction products have not yet been clarified, each of two carboxyl groups (or groups derived from the carboxyl groups in the case of derivative) of a (1) polybasic carboxylic acid usually reacts with one of hydroxy groups (or groups derived from the hydroxy groups in the case of derivative) of a (2) polyhydric alcohol to combine together and further, another hydroxy group of the (2) polyhydric alcohol usually reacts with the carboxyl group of a (3) monobasic aliphatic acid to combine together. The residual carboxyl groups of the (1) polybasic carboxylic acid and the residual hydroxyl groups of the (2) polyhydric alcohol may remain unreacted or may react with other functional groups.

A reaction product (V) is obtained by reacting the above compounds (1) (2), and (4) with each other. Although the chemical structures of the reaction products have not yet been clarified, each of two hydroxy groups of a (2) polyhydric alcohol usually reacts with a carboxyl group of a (1) polybasic carboxylic acid to combine together and further, the residual carboxyl group of the (1) polybasic acid usually reacts with the hydroxy group of a (4) monohydric aliphatic alcohol to combine together. The residual carboxyl groups of the polybasic carboxylic acid and the residual hydroxyl groups of the (2) polyhydric alcohol may remain unreacted or may react with other functional groups.

The use of the mixture of the component (A) and component (B) as the essential component of the refrigerator oil composition (that is, the base oil of lubricating oil) of the present invention is also effective. In this case, the mixing ratio by weight of the component (A) to the component (B) is not particularly limited, but desirably 5 to 95/95 to 5, particularly desirably 10 to 90/90 to 10.

The use of a mineral oil or a synthetic oil other than the above-mentioned (A) polyoxyalkylene glycol derivative or (B) polyester compound as the essential component of the refrigerator oil composition (that is, the base oil of lubricating oil) of the present invention causes insufficient miscibility with a hydrogenated Flon refrigerant such as Flon 134a.

It is necessary to compound (a) a polyhydric alcohol partially esterified with an aliphatic acid and (b) a phosphate compound and/or phosphite compound with the aforementioned (A) a polyoxyalkylene glycol derivative and/or (B) a polyester compound.

By the term "a polyhydric alcohol partially esterified with an aliphatic acid" as used herein is meant a partially esterified product formed from a polyhydric alcohol such as glycol, glycerol, trimethylol propane, pentaerythritol, sorbitan, sorbitol or the like and a saturated or unsaturated straight-chain or branched-chain aliphatic acid having 1 to 24 carbon atoms, preferably from glycerol, sorbitan or sorbitol and an aliphatic acid having 8 to 22 carbon atoms. In particular, an monobasic aliphatic acid ester is most suitable.

In the refrigerator oil composition according to the present invention, the compounding ratio of (a) an aliphatic acid partially esterified with a polyhydric alcohol is not particularly limited and may be optionally selected depending upon the situation, but desirably 0.1 to 10%, particularly desirably 0.5 to 5% each by weight based on the total amount of the composition.

As a component (b), either a phosphate compound or a phosphite compound or both of them is used. In this case, phosphate compounds may be roughly classified into alkyl phosphate compounds and aryl phosphate compounds. A suitable phosphate compound can be exemplified by the compound represented by the general formula

$(R^{16}O)_3P=O$ (IX)

wherein $R^{16}$ is a hydrocarbon radical or chlorinated hydrocarbon radical having a total number of 15 or more carbon atoms, particularly an alkyl group having 8 to 20 carbon atoms (straight-chain or branched-chain, saturated or unsaturated), phenyl group, alkyl-substituted phenyl group having 1 to 12 carbon atoms, chlorinated phenyl group, or chlorinated alkylphenyl group, and may be the same or different. Specific examples include tricresyl phosphate (TCP), triphenyl phosphate, triisopropyl-phenyl phosphate, trioctyl phosphate, trilauryl phosphate, tristearyl phosphate, trioleyl phosphate, diphenyloctyl phosphate, o-, m-, p-monochlorophenyl phosphate, dichlorophenyl phosphate, monochlorotolyl phosphate, dichlorotolyl phosphate and the like. The use of tricresyl phosphate is particularly desirable.

The phosphite compounds to be used as component (b) include a variety of compounds and may be roughly classified into alkyl phosphite compounds and aryl phosphite compounds. A suitable phosphite compound can be exemplified by the compound represented by the general formula

$(R^{17}O)_3P$ (X)

wherein $R^{17}$ is a hydrogen atom or a hydrocarbon radical having a total number of 15 or more carbon atoms, particularly an alkyl group having 8 to 20 carbon atoms (straight-chain or branched-chain, saturated or unsaturated), phenyl group, alkyl-substituted phenyl group having 1 to 12 carbon atoms, and may be the same or different, but excluding the case where two or more of three $R^{17}$s are each a hydrogen atom. Specific examples include trioctyl phosphite, trilauryl phosphite, tristearyl phosphite, trioleyl phosphate, triphenyl phosphite, tricresyl phosphite, tris(nonylphenyl) phosphite, diphenyldecyl phosphite, dioctyl hydrogen phosphite, dilauryl hydrogen phosphite, dioleyl hydrogen phosphite, di(nonylphenyl) hydrogen phosphite and the like.

As a component (b) in the present invention, either a phosphate compound or a phosphite compound or both of them is used. The compounding ratio of component (b) is not particularly limited, but is optionally selected in the range of 0.1 to 5% by weight, preferably 0.3 to 3% by weight based on the total amount of composition.

The composition of the present invention comprises as an essential component (A) a polyoxyalkylene glycol derivative and/or (B) a specific polyester compound, said essential component being compounded with (a) a polyhydric alcohol partially esterified with an aliphatic acid and (b) a phosphate compound and/or phosphite compound. Moreover, various additives that are used in the conventional lubricating oils such as load carrying additives (extreme pressure agent, oiliness agent, antiwear additive, etc.), chlorine capturing agent, antioxidants, metal deactivators, defoaming agents, detergent-dispersants, viscosity index improvers, antirust agents, corrosion inhibitors, pour point depressants, etc. may be optionally blended when necessary.

In addition, mineral oils or synthetic oils that are generally used as base oil of lubricating oil may be used together with the above-mentioned (A) a polyoxyalkylene glycol derivative or (B) a polyester compound according to the demand.

As the load carrying additives, there can be mentioned organic sulfide additives such as monosulfides, polysulfides, sulfoxides, sulfones, thiosulfinates, sulfurized oil and fat, thiocarbonates, thiophenes, thiazoles, methanesulfonic acid esters, etc.; phosphate additives such as phosphoric monoesters, phosphoric diesters, phosphoric triesters (excluding the ester of the general formula (IX)) etc.; phosphite additives (excluding the ester of the general formula (X)) such as phosphorus monoesters, phosphorus diesters, phosphorus triesters, etc.; thiophosphate additives such as thiophosphoric acid triesters; fatty acid additives such as higher fatty acids, hydroxyaryl fatty acids, carboxylic acid-containing polyhydric alcohol esters, metallic soap, etc.; fatty acid ester additives such as polyhydric alcohol esters, acrylic esters, etc.; organic chlorine additives such as chlorinated hydrocarobns, chlorinated carboxylic acid derivatives, etc.; organic fluorine additive such as fluorinated aliphatic carboxylic acids, fluoroethylene resins, fluoroalkyl polysiloxanes, fluorinated graphite, etc.; alcohol additives such as higher alcohols, etc.; and metallic compound additives such as naphthenates (lead naphthenates), fatty acid salts (fatty acid lead), thiophosphates (zinc dialkyl dithiophosphate), thiocarbamates, organomolybdenum compounds, organic tin compounds, organogermanium compounds, boric acid esters, etc.

As the chlorine capturing agents, there can be mentioned compounds having glycidyl ether group, epoxy fatty acid monoesters, epoxidized fats and oils, compounds having epoxy chcloalkyl group, etc. As the antioxidants, there can be included phenols (2.6-di-tert-buryl-p-cresol), aromatic amines (α-naphthylamine), etc. As the metal deactivators, there can be mentioned benzotriazole derivatives, etc. As the deforaming agents, silicone oil (dimethylpolysiloxane), polymethacrylates, etc. can be included. As the detergent dispersants, sulfonates, phenates, succinimides, etc. can be included. As the viscosity index improvers, polymethacrylates, polyisobutylene, ethylene-propylene copolymer, hydrogenated styrene-diene copolymer, etc. can be exemplified.

In what follows, the present invention will be described in more detail by referring to Examples, which however, are not intended to limit the invention thereto.

EXAMPLES 1 TO 18 AND COMPARATIVE EXAMPLES 1 TO 4

The measurements of the wear resistance between aluminum material and steel material, stability and critical miscibility temperature at elevated temperature region were made using a variety of polyoxyalkylene glycol derivatives blended with various additives as sample oils as listed in Table 1 by way of the following testing procedures. The results are shown in Table 1.

(1) Wear Resistance

The wear loss was measured using aluminum (A 4032) as a block and steel (SUJ-2) as a pin in Falex wear test, at a Flon 134a blow rate of 10 liter/hour under a load of 500 pounds for test hour of one hour.

(2) Stability

The stability was evaluated by means of shield tube test. A mixture of the sample oil and the refrigerant (Flon 134a) (2:1) was sealed up in a glass tube into which iron, copper and aluminum catalysts were inserted. After heating for 720 hours at 175° C., the oil and catalysts were observed for appearance to check whether or not a sludge was formed.

(3) Critical Miscibility Temperature at Elevated Temperature Region

A mixture of the sample oil and the refrigerant (Flon 134a) (1:9 by weight) was sealed up in a pressure glass vessel with an inner volume of about 10 ml. When the mixture was uniformly mingled with each other, its temperature was gradually raised. Thus the initial temperature of phase separation of the sample oil from the refrigerant was measured to determine the critical miscibility temperature at elevated temperature region.

TABLE 1

| | | Composition | | | |
| | | (a) Component | | (b) Component | |
| No. | Polyoxyalkylene glycol derivative | Species | compounding ratio (wt %) | Species | compounding ratio (wt %) |
| --- | --- | --- | --- | --- | --- |
| Example 1 | polyoxypropylene glycol dimethyl ether*1 | sorbitan monooleate | 1 | TCP*7 | 1 |
| Example 2 | polyoxypropylene glycol dimethyl ether*1 | sorbitan monooleate | 2 | TCP*7 | 1 |
| Example 3 | polyoxypropylene glycol dimethyl ether*1 | sorbitan monooleate | 5 | TCP*7 | 1 |
| Example 4 | polyoxypropylene glycol dimethyl ether*1 | sorbitan monooleate | 10 | TCP*7 | 1 |
| Example 5 | polyoxypropylene glycol dimethyl ether*1 | glycerol monooleate | 1.5 | TCP*7 | 1 |
| Example 6 | polyoxypropylene glycol dimethyl ether*1 | glycerol monooleate | 3 | TCP*7 | 1 |
| Example 7 | polyoxypropylene glycol dimethyl ether*2 | sorbitan monooleate | 1 | TCP*7 | 1 |
| Example 8 | polyoxypropylene glycol dimethyl ether*2 | glycerol monooleate | 1 | TCP*7 | 1 |
| Example 9 | polyoxypropylene glycol monomethyl ether*3 | sorbitan monooleate | 1 | TCP*7 | 1 |
| Example 10 | polyoxypropylene glycol monomethyl ether*3 | glycerol monooleate | 1 | TCP*7 | 1 |
| Example 11 | polyoxypropylene glycol*4 | sorbitan monooleate | 1 | TCP*7 | 1 |
| Example 12 | polyoxypropylene glycol*4 | glycerol monooleate | 1 | TCP*7 | 1 |

TABLE 1-continued

| | | | | | |
|---|---|---|---|---|---|
| Example 13 | polyoxypropylene glycol glycerol derivative trimethyl ether*5 | sorbitan monooleate | 1 | TCP*7 | 1 |
| Example 14 | polyoxypropylene glycol monobutyl ether*6 | sorbitan monooleate | 1 | TCP*7 | 1 |
| Example 15 | polyoxypropylene glycol dimethyl ether*1 | sorbitan monooleate | 2 | TOP*8 | 1 |
| Example 16 | polyoxypropylene glycol dimethyl ether*1 | sorbitan monooleate | 1 | DOHP*9 | 1 |
| Example 17 | PO.EO(9:1) copolymer glycol dimethyl ether*10 | sorbitan monooleate | 1 | TCP*7 | 1 |
| Example 18 | PO.EO(8:2) copolymer glycol dimethyl ether*11 | sorbitan monooleate | 1 | TCP*7 | 1 |
| Comparative Example 1 | polyoxypropylene glycol dimethyl ether*1 | sorbitan monooleate | 5 | — | — |
| Comparative Example 2 | polyoxypropylene glycol dimethyl ether*1 | sorbitan monooleate | — | TCP*7 | 1 |
| Comparative Example 3 | polyoxypropylene glycol dimethyl ether*1 | dioctyl adipate | 10 | TCP*7 | 1 |
| Comparative Example 4 | polyoxypropylene glycol dimethyl ether*1 | chlorinated paraffin | 1.5 | — | — |

| | | Performance | | | |
|---|---|---|---|---|---|
| | Wear | Stability | | | Critical miscibility |
| No. | resistance (mg) | Appearance | Catalyst | Sludge formation | temperature at elevated temperature region (°C.) |
| Example 1 | 1.0 | good | good | none | 60 or higher |
| Example 2 | 0.6 | good | good | none | 60 or higher |
| Example 3 | 0.2 | good | good | none | 60 or higher |
| Example 4 | 0.2 | good | good | none | 60 or higher |
| Example 5 | 20 | good | good | none | 60 or higher |
| Example 6 | 8 | good | good | none | 60 or higher |
| Example 7 | 1.5 | good | good | none | 60 or higher |
| Example 8 | 23 | good | good | none | 60 or higher |
| Example 9 | 2.0 | good | good | none | 60 or higher |
| Example 10 | 3.1 | good | good | none | 60 or higher |
| Example 11 | 2.5 | good | good | none | 60 or higher |
| Example 12 | 2.9 | good | good | none | 60 or higher |
| Example 13 | 1.8 | good | good | none | 60 or higher |
| Example 14 | 2.1 | good | good | none | 56 |
| Example 15 | 0.5 | good | good | none | 60 or higher |
| Example 16 | 0.4 | good | good | none | 60 or higher |
| Example 17 | 0.6 | good | good | none | 60 or higher |
| Example 18 | 0.6 | good | good | none | 60 or higher |
| Comparative Example 1 | 116 | good | good | none | 60 or higher |
| Comparative Example 2 | 65 | good | good | none | 60 or higher |
| Comparative Example 3 | 61 | good | good | none | 60 or higher |
| Comparative Example 4 | 27 | brown | color change (corroded) | formed | 60 or higher |

*1 Average molecular weight 1270,
*2 Average molecular weight 640,
*3 Average molecular weight 1030,
*4 Average molecular weight 1100,
*5 Average molecular weight 1200,
*6 Average molecular weight 1100,
*7 Tricresyl phosphate,
*8 Trioctyl phosphate,
*9 Dioctyl hydrogen phosphite,
*10 PO and EO indicate propylene oxide and ethylene oxide, respectively. This ether has an average molecular weight of 1300.
*11 PO and EO indicate propylene oxide and ethylene oxide, respectively. This ether has an average molecular weight of 1300.

EXAMPLES 19 TO 33 AND COMPARATIVE EXAMPLES 5 TO 8

The measurements of the wear resistance between aluminum material and steel material, stability and critical miscibility temperature at elevated temperature region were made using a variety of polyester compounds blended with various additives as sample oils as listed in Table 2 by way of the following testing procedures. The results are shown in Table 2.

(1) Wear Resistance

The wear loss was measured using aluminum (A 4032) as a block and steel (SUJ-2) as a pin in Falex wear test, at a Flon 134a blow rate of 10 liter/hour under a load of 400 pounds for a test hour of one hour at a revolution of 1200 rpm at an oil temperature of 80° C.

(2) Stability

The stability was evaluated by means of shield tube test. A mixture of the sample oil and the refrigerant (Flon 134a) (2:1) was sealed up in a glass tube into which iron, copper and aluminum catalysts were inserted. After heating for 720 hours at 175° C., the oil and catalysts were observed for appearance to check whether or not a sludge was formed.

(3) Critical Miscibility Temperature at Elevated Temperature Region

A mixture of the sample oil and the refrigerant (Flon 134a) (1:9 by weight) was sealed up in a pressure glass vessel with an inner volume of about 10 ml. When the mixture was uniformly mingled with each other, its temperature was gradually raised. Thus the initial temperature of phase separation of the sample oil from the refrigerant was measured to determine the critical miscibility temperature at elevated temperature region.

(4) Saturated Moisture

The sample oil and water each of 20 ml were mixed with stirring and were allowed to stand to separate the oil phase from the water phase. Thus the moisture in the oil phase was measured.

TABLE 2

| | | Composition | | | |
|---|---|---|---|---|---|
| | | (a) Component | | (b) Component | |
| No. | Polyester compound | Species | compounding ratio (wt %) | Species | compounding ratio (wt %) |
| Example 19 | ester compound I*[1] | sorbitan monooleate | 1 | TCP | 1 |
| Example 20 | ester compound I*[1] | sorbitan monooleate | 2 | TCP | 1 |
| Example 21 | ester compound I*[1] | sorbitan monooleate | 5 | TCP | 1 |
| Example 22 | ester compound I*[1] | sorbitan monooleate | 10 | TCP | 1 |
| Example 23 | ester compound I*[1] | glycerol monooleate | 1.5 | TCP | 1 |
| Example 24 | ester compound I*[1] | glycerol monooleate | 3 | TCP | 1 |
| Example 25 | ester compound II*[2] | sorbitan monooleate | 3 | TCP | 1 |
| Example 26 | ester compound II*[2] | glycerol monooleate | 3 | TCP | 1 |
| Example 27 | ester compound III*[3] | sorbitan monooleate | 3 | TCP | 1 |
| Example 28 | ester compound III*[3] | glycerol monooleate | 3 | TCP | 1 |
| Example 29 | ester compound IV*[4] | sorbitan monooleate | 3 | TCP | 1 |
| Example 30 | ester compound IV*[4] | glycerol monooleate | 3 | TCP | 1 |

| | Performance | | | | |
|---|---|---|---|---|---|
| | Wear resistance | Stability | | Critical miscibility temperature at elevated | Saturated mositure |
| NO. | (mg) | Appearance | Catalyst | Sludge formation | temperature region (°C.) | (wt %) |
| Example 19 | 90 | good | good | none | 90 or higher | 0.2 |
| Example 20 | 82 | good | good | none | 90 or higher | 0.2 |
| Example 21 | 0.5 | good | good | none | 90 or higher | 0.2 |
| Example 22 | 0.2 | good | good | none | 90 or higher | 0.2 |
| Example 23 | 73 | good | good | none | 90 or higher | 0.2 |
| Example 24 | 22 | good | good | none | 90 or higher | 0.2 |
| Example 25 | 43 | good | good | none | 90 or higher | 0.2 |
| Example 26 | 50 | good | good | none | 90 or higher | 0.2 |
| Example 27 | 41 | good | good | none | 90 or higher | 0.2 |
| Example 28 | 49 | good | good | none | 90 or higher | 0.2 |
| Example 29 | 30 | good | good | none | 90 or higher | 0.2 |
| Example 30 | 38 | good | good | none | 90 or higher | 0.2 |

| | | Composition | | | |
|---|---|---|---|---|---|
| | | (a) Component | | (b) Component | |
| No. | Polyester compound | Species | compounding ratio (wt %) | Species | compounding ratio (wt %) |
| Example 31 | mixture of polyoxypropylene glycol dimethyl ether*[5] and ester compound*[3] (1:1) | sorbitan monooleate | 5 | TCP | 1 |
| Example 32 | ester compound II*[2] | sorbitan monooleate | 5 | TOP | 1 |
| Example 33 | ester compound I*[1] | sorbitan monooleate | 5 | DOHP | 1 |
| Comparative Example 5 | ester compound I*[1] | sorbitan monooteate | 5 | — | — |
| Comparative Example 6 | ester compound I*[1] | — | — | TCP | 1 |
| Comparative Example 7 | ester compound I*[1] | dioctyl adipate | 10 | TCP | 1 |
| Comparative Example 8 | ester compound I*[1] | chlorinated paraffin | 1.0 | — | — |

| | Performance | | | | |
|---|---|---|---|---|---|
| | Wear resistance | Stability | | Critical miscibility temperature at elevated | Saturated mositure |
| No. | (mg) | Appearance | Catalyst | Sludge formation | temperature region (°C.) | (wt %) |

TABLE 2-continued

| | | | | | | |
|---|---|---|---|---|---|---|
| Example 31 | 0.2 | good | good | none | 90 or higher | 1.0 |
| Example 32 | 0.2 | good | good | none | 90 or higher | 0.2 |
| Example 33 | 0.2 | good | good | none | 90 or higher | 0.2 |
| Comparative Example 5 | Seizing | good | good | good | 90 or higher | 0.2 |
| Comparative Example 6 | 190 | good | good | good | 90 or higher | 0.2 |
| Comparative Example 7 | Seizing | good | good | good | 90 or higher | 0.2 |
| Comparative Example 8 | 20 | brown | color change | formed | 90 or higher | 0.2 |

*[1] ester compound I: polyester from neopentyl glycol, adipic acid and 2-methyl caprate
kinematic viscosity 90.5 cSt (40° C.), pour point −50° C. or lower
*[2] ester compound II: hexaester from dipentaerythritol and isovaleric acid
kinematic viscosity 70.5 cSt (40° C.), pour point −45° C.
*[3] ester compound III: trimethylol propane trinonanate (Product of Ciba-Geigy, trademark Reolube LT-2700
kinematic viscosity 20.3 cSt (40° C.), pour point −50° C. or lower
*[4] ester compound IV: polyester from poly(1,2-propylene)glycol, adipic acid and methyl alcohol
kinematic viscosity 33.2 cSt (40° C.), pour point −50° C. or lower
*[5] average molecular weight of polyoxypropylene glycol dimethyl ether: 1270

INDUSTRIAL APPLICABILITY

The refrigerator oil composition according to the present invention is excellent in stability, miscibility with a refrigerant of a hydrogen-containing hydrofluorocarbon such as Flon 134a and lubrication performance in the atmosphere of the above refrigerant, and functions quite effectively to improve wear resistance especially between aluminum material and steel material with an additional advantage of low hygroscopicity. Accordingly, the refrigerator oil composition according to the present invention is utilized as a lubricating oil for a various types of refrigerators using a hydrogenated Flon compound as a refrigerant as well as a compression type refrigerator. Above all, the refrigerator oil composition according to the present invention has satisfactory miscibility with hydrogenated Flon compounds (hydrogenated fluoroalkane) such as Flon 134a; 1,1,2,2-tetrafluoroethane (Flon 134); 1,1-dichloro-2,2,2-trifluoroethane (Flon 123); 1-chloro-1,1-difluoroethane (Flon 142b); 1-1-difluoro ethane (Flon 152a); chlorodifluoromethan (Flon 22), trifluoromethan (Flon 23), etc.

Accordingly, the refrigerator oil composition according to the present invention is expected to be effectively utilized as a lubricating oil for refrigerators using various types of hydrogenated Flon compounds as refrigerant, electric refrigerators or freezers, coolers (especially, air conditioner for car), heat pumps, etc.

We claim:

1. A refrigerator oil composition for a hydrogen-containing hydrofluorocarbon refrigerant which comprises a component (1) that is at least one compound selected from the group consisting of (A) a polyoxyalkylene glycol derivative represented by the formula $$R^1-O-(R^2O)_m-R^3 \quad (I)$$

and/or by the formula

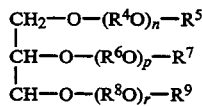
(II)

wherein $R^1$, $R^3$, $R^5$, $R^7$ and $R^9$ are each a hydrogen atom, an alkyl group having 1 to 20 carbon atoms, an alkenyl group having 2 to 20 carbon atoms, an alkynyl group having 2 to 20 carbon atoms, an acyl group having 1 to 20 carbon atoms, an aryl group having 6 to 20 carbon atoms, an aralkyl group having 7 to 20 carbon atoms or a cycloalkyl group having 4 to 20 carbon atoms; $R^2$, $R^4$, $R^6$ and $R^8$ are each an alkylene group having 2 to 4 carbon atoms; m is an integer from 3 to 100; and n, p and r are each a positive integer simultaneously satisfying the relationship $3 \leq n+p+r \leq 100$; and (B) a polyester compound having a kinematic viscosity at 40° C. of 5 to 1000 cSt and at least two ester linkages which is a reaction product of (i) a polybasic carboxylic acid or derivative thereof, (ii) a polyhydric alcohol or derivative thereof, and (iii) a monobasic aliphatic acid or derivative thereof, a reaction product of (i) a polybasic carboxylic acid or derivative thereof, (ii) a polyhydric alcohol or derivative thereof, (iv) a monohydric aliphatic alcohol or derivative thereof, a reaction product of (ii) a polyhydric alcohol or derivative thereof, and (iii) a monobasic aliphatic acid or derivative thereof, or a reaction product of (iv) a monohydric aliphatic alcohol or derivative thereof, and (i) a polybasic carboxylic acid or derivative thereof; a component (2) that is (a) a polyhydric alcohol partially esterified with a monobasic aliphatic acid and a component (3) that is at least one organic compound (b) selected from the group consisting of a phosphate compound and a phosphite compound.

2. The refrigerator oil composition according to claim 1, wherein said (iii) a monobasic aliphatic acid or derivative thereof is that which contains a branched-chain alkyl group of 3 to 18 carbon atoms.

3. The refrigerator oil composition according to claim 1, wherein said (iv) a monohydric aliphatic alcohol or derivative thereof is that which contains a branched-chain alkyl group having 3 to 18 carbon atoms.

4. The refrigerator oil composition according to claim 1, wherein component (1) comprises a mixture of component (A) and component (B) in a mixing ratio by weight of component (A) to component (B) of 5-95:95-5.

5. A refrigerator oil composition for a hydrogen-containing hydrofluorocarbon refrigerant which comprises at least one polyoxyalkylene glycol derivative represented by the formula $$R^1-O-(R^2O)_m-R^3 \quad (I)$$

and/or by the formula

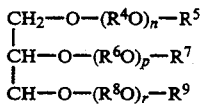

wherein $R^1$, $R^3$, $R^5$, $R^7$ and $R^9$ are each a hydrogen atom an alkyl group having 1 to 20 carbon atoms, an alkenyl group having 2 to 20 carbon atoms, an alkynyl group having 2 to 20 carbon atoms, an acyl group having 1 to 20 carbon atoms, an aryl group having 6 to 20 carbon atoms, an aralkyl group having 7 to 20 carbon atoms or a cycloalkyl group having 4 to 20 carbon atoms; $R^2$, $R^4$, $R^6$ and $R^8$ are each an alkylene group having 2 to 4 carbon atoms; m is an integer from 3 to 100; and n, p and r are each a positive integer simultaneously satisfying the relationship $3 \leq n+p+r \leq 100$; (a) a polyhydric alcohol partially esterified with a monobasic aliphatic acid; and (b) at least one organic compound selected from the group consisting of a phosphate compound and a phosphite compound.

6. A refrigerator oil composition for a hydrogen-containing hydrofluorocarbon refrigerant which comprises at least one polyoxyalkylene glycol derivative represented by the formula

wherein $R^1$ and $R^3$ are each a hydrogen atom, an alkyl group having 1 to 20 carbon atoms, an alkenyl group having 2 to 20 carbon atoms, an alkynyl group having 2 to 20 carbon atoms, an acyl group having 1 to 20 carbon atoms, an aryl group having 6 to 20 carbon atoms, an aralkyl group having 7 to 20 carbon atoms or a cycloalkyl group having 4 to 20 carbon atoms; —$(R^2O)_m$— represents a copolymer chain of ethylene oxide units and propylene oxide units; and m is an integer from 3 to 100; (a) a polyhydric alcohol partially esterified with a monobasic aliphatic acid; and (b) at least one organic compound selected from the group consisting of a phosphate compound and a phosphite compound.

7. A refrigerator oil composition for a hydrogen-containing hydrofluorocarbon refrigerant which comprises at least one a polyoxyalkylene glycol derivative represented by the formula

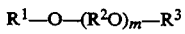

wherein $R^1$ and $R^3$ are each a hydrogen atom, an alkyl group having 1 to 20 carbon atoms, an alkenyl group having 2 to 20 carbon atoms, an alkynyl group having 2 to 20 carbon atoms, an acyl group having 1 to 20 carbon atoms, an aryl group having 6 to 20 carbon atoms, an aralkyl group having 7 to 20 carbon atoms or a cycloalkyl group having 4 to 20 carbon atoms; —$(R^2O)_m$— represents a copolymer chain of ethylene oxide units of 30% by weight or less and propylene oxide units; and m is an integer from 3 to 100; (a) a polyhydric alcohol partially esterified with a monobasic aliphatic acid; and at least one organic compound (b) selected from the group consisting of a phosphate compound and a phosphite compound.

8. The refrigerator oil composition according to claim 1, 5, 6 or 7, wherein said composition contains 0.1 to 10% by weight of said (a) a polyhydric alcohol partially esterified with a monobasic aliphatic acid and 0.1 to 5% by weight of said at least one compound (b) selected from the group consisting of a phosphate compound and a phosphite compound.

9. A method for effecting lubrication in a compression-type refrigerator using a hydrogen-containing hydrofluorocarbon as a refrigerant characterized in that the lubrication is effected by the use of said refrigeration oil composition as defined in claim 1, 5, 6 or 7.

10. A refrigerator oil composition according to claim 1, 5, 6 or 7, wherein the (a) polyhydric alcohol partially esterified with a monobasic aliphatic acid comprises a partially esterified product formed from a polyhydric alcohol selected from the group consisting of glycol, glycerol, trimethylol propane, pentaerythritol, sorbitan and sorbitol and a saturated or unsaturated straight-chain or branched-chain monobasic aliphatic acid having 1 to 24 carbon atoms.

11. A refrigerator oil composition according to claim 10, wherein the monobasic aliphatic acid has 8 to 22 carbon atoms and the polyhydric alcohol is glycerol, sorbitan or sorbitol.

12. The refrigerator oil composition according to claim 1, 5, 6 or 7, wherein the (a) polyhydric alcohol partially esterified with a monobasic aliphatic acid is in an amount of 0.1 to 10% by weight based on the total weight of the composition.

13. The refrigerator oil composition according to claim 1, wherein the phosphate compound is represented by the general formula

wherein $R^{16}$ is a hydrocarbon radical or chlorinated hydrocarbon radical having a total number of 15 or more carbon atoms and the phosphite compound is represented by the general formula

wherein $R^{17}$ is a hydrogen atom or a hydrocarbon radical having a total number of 15 or more carbon atoms, excluding the case where two or more of the $R^{17}$s are each a hydrogen atom.

14. The refrigerator oil composition according to claim 1, wherein the phosphate compound is selected from the group consisting of tricresyl phosphate, triphenyl phosphate, triisopropyl-phenyl phosphate, trioctyl phosphate, trilauryl phosphate, tristearyl phopshate, trioleyl phosphate, diphenyloctyl phosphate, o-monochlorophenyl phosphate, m-monochlorophenyl phosphate, p-monochlorophenyl phosphate, dichlorophenyl phosphate, monochlorotolyl phosphate and dichlorotolyl phosphate and the phosphite compound is selected from the group consisting of triocyl phosphite, trilauryl phosphite, tristearyl phosphite, trioleyl phosphite, triphenyl phosphite, tricresyl phosphite, tris(nonylphenyl) phosphite, diphenyldecyl phosphite, dioctyl hydrogen phosphite, dilauryl hydrogen phosphite, dioleyl hydrogen phosphite and di(nonylphenyl) hydrogen phosphite.

15. A refrigerator oil composition for a hydrogen-containing hydrofluorocarbon refrigerant which comprises a component (1) that is at least one compound selected from the group consisting of a polyester compound having a kinematic viscosity at 40° C. of 5 to 1000 cSt and at least two ester linkages which is a reaction product of (i) a polybasic carboxylic acid or derivative thereof, (ii) a polyhydric alcohol or derivative thereof and (iii) a monobasic aliphatic acid or derivative thereof, a reaction product of (i) a polybasic carboxylic acid or derivative thereof, (ii) a polyhydric alcohol or derivative thereof, (iv) a monohydric aliphatic alcohol or derivative thereof, a reaction product of (ii) a polyhydric alcohol or derivative thereof, and (iii) a monobasic aliphatic acid or derivative thereof, or a reaction product of (iv) a monohydric aliphatic alcohol or derivative thereof, and (i) a polybasic carboxylic acid or derivative thereof; a component (2) that is (a) a polyhydric alcohol partially esterified with an aliphatic acid and a component (3) that is at least one organic compound (b) selected from the group consisting of a phosphate compound and a phosphite compound.

16. A refrigerator oil composition according to claim 15, wherein said composition contains 0.1 to 10% by weight of said (a) a polyhydric alcohol partially esterified with an aliphatic acid and 0.1 to 5% by weight of said at least one compound (b) selected from the group consisting of a phosphate compound and a phosphite compound.

17. The refrigerator oil composition according to claim 15, wherein said (iii) a monobasic aliphatic acid or derivative thereof is that which contains a branched-chain alkyl group of 3 to 18 carbon atoms.

18. The refrigerator oil composition according to claim 15, wherein said (iv) a monohydric aliphatic alcohol or a derivative thereof is that which contains a branched-chain alkyl group having 3 to 18 carbon atoms.

19. A method of effecting lubrication in a compression-type refrigerator using a hydrogen-containing hydrofluorocarbon as a refrigerant characterized in that the lubrication is effected by the use of said refrigeration oil composition as defined in claim 15.

20. A refrigerator oil composition according to claim 15, wherein the (a) polyhydric alcohol partially esterified with an aliphatic acid comprises a partially esterified product formed from a polyhydric alcohol selected from the group consisting of glycol, glycerol, trimethylol propane, pentaerythritol, sorbitan and sorbitol and a saturated or unsaturated straight-chain or branched-chain aliphatic acid having 1 to 24 carbon atoms.

21. A refrigerator oil composition according to claim 20, wherein the aliphatic acid has 8 to 22 carbon atoms and the polyhydric alcohol is glycerol, sorbitan or sorbitol.

22. The refrigerator oil composition according to claim 15, wherein the (a) polyhydric alcohol partially esterified with an aliphatic acid is in an amount of 0.1 to 10% by weight based on the total weight of the composition.

23. The refrigerator oil composition according to claim 15, wherein the phosphate compound is represented by the general formula:

  (IX)

wherein $R^{16}$ is a hydrocarbon radical or chlorinated hydrocarbon radical having a total number of 15 or more carbon atoms and the phosphite compound is represented by the general formula

  (X)

wherein $R^{17}$ is a hydrogen atom or a hydrocarbon radical having a total number of 15 or more carbon atoms, excluding the case where two or more of the $R^{17}$s are each a hydrogen atom.

24. The refrigerator oil composition according to claim 15, wherein the phosphate compound is selected from the group consisting of tricresyl phosphate, triphenyl phosphate, triisopropyl-phenyl phosphate, trioctyl phosphate, trilauryl phosphate, tristearyl phosphate, trioleyl phosphate, diphenyloctyl phosphate, o-monochlorophenyl phosphate, m-monochlorophenyl phosphate, p-monochlorophenyl phosphate, dichlorophenyl phosphate, monochlorotolyl phosphate and dichlorotolyl phosphate and the phosphite compound is selected from the group consisting of triocyl phosphite, trilauryl phosphite, tristearyl phosphite, trioleyl phosphite, triphenyl phosphite, tricresyl phosphite, tris(nonylphenyl) phosphite, diphenyldecyl phosphite, dioctyl hydrogen phosphite, dilauryl hydrogen phosphite, dioleyl hydrogen phosphite and di(nonylphenyl) hydrogen phosphite.

* * * * *